Patented Oct. 22, 1940

2,218,567

UNITED STATES PATENT OFFICE

2,218,567

PREPARATION OF ALKALI HEMICELLULOSE

Elwood V. White, Moscow, Idaho, assignor to The Dow Chemical Company, Midland, Mich., a corporation of Michigan No Drawing. Application September 13, 1939, Serial No. 294,682

6 Claims. (Cl. 260—209)

This invention relates to a new composition of matter comprising hemicellulose, caustic alkali and water, substantially free from cellulose and adapted to the preparation of uniformly substituted ethers of hemicellulose.

The term "hemicellulose" as used in the description of the present invention refers to those hemicelluloses extracted by dilute alkali from grasses or woody tissue which yield furfural on heating with 12 per cent hydrochloric acid in the manner described by Powell and Whittaker, J. Soc. Chem. Ind. 43, 35 (1924), and are further characterized by the fact that they yield a preponderant proportion of pentoses, chiefly xylose or arabinose on hydrolyysis. They contain substantially no cellulose. They are obtainable from deciduous or non-deciduous wood, mesquite, wheat straw, oat straw, flax, esparto or the like.

Compositions of matter comprising hemicellulose of this description, caustic soda and water, and which may be termed "alkali hemicelluloses" are known to the art. These compositions have been prepared as intermediates in the production of pentosan ethers but they have been found not to be entirely suited to this use on account of their gummy, sticky nature which prevents uniform penetration of the etherifying agent during the etherification treatment, giving non-uniform and lowly etherified pentosan ethers.

It is accordingly an object of this invention to prepare alkali hemicelluloses adapted to yield uniformly substituted products on treatment with an etherifying agent.

It is a further object to prepare an alkali hemicellulose which will give a highly substituted ether in a single etherification treatment.

Further objects will become apparent in the following.

I attain these objects by combining hemicellulose with caustic soda and water in amounts sufficient to give a product containing the ratios of ingredients:

$$\frac{NaOH}{hemicellulose} = 1.5\text{--}14.0/1, \text{ (preferably } 1.85\text{--}4.0/1)$$

and correspondingly $$\frac{H_2O}{hemicellulose} = 0.8\text{--}4.0/1 \text{ (preferably } 0.8\text{--}1.85/1)$$

These ratios correspond to a caustic soda solution of from 55 to 80 per cent concentration. Any method for mixing the correct proportion of hemicellulose, caustic soda and water, for example, those known to the alkali cellulose art, may be employed in the practice of the invention. Thus, hemicellulose conditioned in chambers of constant known humidity and therefore containing a known uniformly dispersed weight of water, may be mixed with powdered caustic soda and water, as required. Again, solutions of caustic soda, containing ratios of water to caustic soda greater than those described in the alkali hemicellulose, may be mixed with the appropriate quantities of hemicellulose in the presence of water-binding agents such as oxides of the alkali metals or alkaline earth metals. A preferred method of preparing my alkali hemicellulose, however, involves the use of caustic soda solution of 55 to 80 per cent concentration. A known quantity of this solution is adjusted to a temperature of about 10 centigrade degrees or more above its freezing point and placed in a suitable reaction vessel. Sufficient hemicellulose to bring the proportions by weight of caustic soda to hemicellulose within the limits 1.5 to 14.0/1, and the corresponding ratios of water to hemicellulose within the limits 0.8 to 4/1, is mixed with the caustic solution. Rapid penetration of the hemicellulose by the hot caustic soda takes place, and on cooling a product well suited for etherification is obtained.

The weight of hemicellulose to be added to the caustic soda solutions, as delimited by the above-stated ratios, amounts to from about 5 per cent to 45 per cent of the weight of the latter. Also, the temperatures of the caustic soda solutions when making the addition will have widely different values depending on the solution concentrations. Thus, the freezing points of caustic soda solutions of concentrations: 55 per cent, 65 per cent, 75 per cent and 80 per cent are approximately 32° C., 63° C., 72° C. and 140° C., respectively. It will be noted that the value of the freezing point increases rapidly with concentrations greater than about 75 per cent, and mixing of hemicellulose with caustic soda of 80 per cent concentration will have to be made at temperatures approximating 150° C. For this reason, it is preferred not to use caustic soda of concentration greater than 80 per cent, as the necessary impregnation temperatures cause degradation of hemicellulose, leading to etherified products of poor color and low viscosity.

The following examples illustrate the practice of the invention:

Example 1

100 parts by weight of caustic soda solution of 70 per cent strength are placed in a beaker and heated to a temperature of 70° C. 25 parts by weight of cellulose-free hemicellulose, obtained by extraction of aspen chips with dilute alkali and which analyze for pentosan 94.0 per cent by Powell and Whittaker method, are spread on the surface of the caustic solution and immediately stirred in. Rapid penetration of the hemicellulose by the caustic solution takes place giving a slightly pasty mass which, on cooling, becomes a fine granular powder of composition: caustic soda, 56 per cent; water, 24 per cent; hemicellulose, 20 per cent. This product is very suitable for etherification, giving uniformly substituted hemicellulose ethers. As an illustration of this utility, the appended description of an ethylation is given:

A quantity of alkali hemicellulose, prepared from 25 grams of aspen hemicellulose in the manner described above, is placed in a 2.4 litre rotating steel bomb equipped with steel rollers to provide agitation, and 1.5 litres of ethyl chloride are added. The bomb is then sealed and heated at approximately 125° C. for 6 to 7 hours.

The reaction product is washed from the bomb with ethyl chloride in which the ether product is insoluble, filtered, and the residue extracted with chloroform to form a dilute solution which is then evaporated down to small bulk. This chloroform solution is poured drop-wise into well stirred, boiling water, yielding a light colored, flocculent precipitate of ethoxy content 42 per cent, indicating that complete etherification (2 ethoxy groups per mole) had occurred.

The dried precipitate, which consists of ethyl hemicellulose or ethyl pentosan and comprises largely ethyl xylosan, dissolves in chloroform, in a solvent composed of 67 parts of benzene and 33 parts of methanol, and in similar solvents, to yield solutions of food clarity which have application in the artificial film and filament forming arts. Further, the ethyl hemicellulose is adapted for use in coating compositions and, on account of its thermoplastic stable nature, for the manufacture of plastic masses.

Example 2

25 parts by weight of hemicellulose are incorporated at 95° C. with 125 parts by weight of caustic soda solution of 75 per cent concentration in the manner described in Example 1. The product has the composition: caustic soda, 62.5 per cent; water, 20.8 per cent; hemicellulose, 16.7 per cent; and gives a uniform, light-colored ethyl hemicellulose on ethylation.

Example 3

25 parts by weight of hemicellulose are mixed at 160° C. with 100 parts by weight of caustic soda solutions of 80 per cent concentration in the way described in Example 1. The product contains: caustic soda, 64 per cent; water, 16 per cent; and hemicellulose, 20 per cent; and yields on ethylation a uniform, light-colored ethyl hemicellulose of somewhat lower viscosity than that obtained in the process of Example 2.

Example 4

25 parts by weight of hemicellulose are stirred into 125 parts by weight of 65 per cent caustic soda solution at 70° C. in the way described in Example 1. The product contains caustic soda, 52 per cent; water, 28 per cent; hemicellulose, 20 per cent; and ethylates to a high viscosity, light-colored, uniform ethyl hemicellulose.

Other etherifying agents may be employed to convert the new alkali hemicellulose to uniform, solvent-soluble pentosan ethers. Such agents include, for example, the alkyl halides, including methyl bromide, methyl chloride, ethyl bromide, propyl chloride, butyl chloride, amyl chloride, lauryl chloride, and the like; aralkyl halides, including benzyl chloride and phenyl ethyl chloride; and lower alkyl sulphates, including methyl and ethyl sulphate.

I claim:

1. A composition of matter, suited to the production of etherified products, which comprises sodium hydroxide, water, and a furfural-yielding hemicellulose substantially free from cellulose containing these ingredients in the ratios by weight of caustic soda to hemicellulose of from 1.5 to 14.0/1 and correspondingly of water to hemicellulose of from 0.8 to 4.0/1.

2. A composition of matter, suited to the production of etherified products, which comprises a furfural-yielding hemi-cellulose, sodium hydroxide and water containing these ingredients in the ratios by weight of caustic soda to hemicellulose of from 1.85 to 4.0/1 and of water to hemicellulose of from 0.8 to 1.85/1.

3. The composition of claim 1 wherein the hemicellulose is a xylan.

4. A process for making alkali hemicellulose which comprises adding a hemicellulose substantially free from cellulose to a liquid solution of caustic soda of 55 to 80 per cent concentration in amount to produce an alkali to hemicellulose ratio of from 1.5 to 14.0/1 and correspondingly a ratio of water to hemicellulose of from 0.8 to 4.0/1.

5. A process for making alkali hemicellulose which comprises adding a finely divided hemicellulose substantially free from cellulose to a liquid solution of caustic soda of 55 to 80 per cent concentration at temperatures of not greater than 10 centrigrade degrees above its freezing point to produce an alkali to hemicellulose ratio of from 1.5 to 14.0/1 and correspondingly of water to hemicellulose of from 0.8 to 4.0/1.

6. The method which comprises adding a hemicellulose substantially free from cellulose to a liquid solution of caustic soda of 55 to 80 per cent concentration in amount to produce an alkali to hemicellulose ratio of from 1.5 to 14.0/1 and correspondingly of water to hemicellulose of from 0.8 to 4.0/1, and etherifying the so-formed alkali hemicellulose to produce a uniform, organo-soluble hemicellulose ether.

ELWOOD V. WHITE.